United States Patent [19]

Lin

[11] Patent Number: 5,657,670
[45] Date of Patent: Aug. 19, 1997

[54] BICYCLE HEAD TUBE SEALING STRUCTURE

[76] Inventor: Wen-Hwa Lin, No. 5, Ming Shen Rd., Ta Chia Chen, Taichung Hsien, Taiwan

[21] Appl. No.: 528,211

[22] Filed: Sep. 13, 1995

[51] Int. Cl.$^6$ ............................................. B62K 21/12
[52] U.S. Cl. ............................................. 74/551.1; 280/279
[58] Field of Search ........................... 74/551.1, 551.2, 74/551.3; 280/279, 280

[56] References Cited

U.S. PATENT DOCUMENTS

| | | | |
|---|---|---|---|
| 5,095,770 | 3/1992 | Rader, III | 74/551.1 |
| 5,319,993 | 6/1994 | Chiang | 74/551.1 |
| 5,387,255 | 2/1995 | Chiang | 74/551.1 |
| 5,400,676 | 3/1995 | Kao | 74/551.1 |
| 5,536,104 | 7/1996 | Chen | 74/551.1 X |

*Primary Examiner*—Charles A. Marmor
*Assistant Examiner*—Saul Rodriguer
*Attorney, Agent, or Firm*—Varndell Legal Group

[57] ABSTRACT

A bicycle head tube sealing structure including a plug cap at the top end of the head tube, a packing block disposed inside the top tube of the front fork, a screw inserted through the plug cap and threaded into the packing block, a stop plate mounted inside the top tube of the front fork, a spring mounted around the screw and stopped between the plug cap and the stop plate, and an expansion ring mounted around the screw between the stop plate and the packing block when, the screw is turned in one direction, the packing block is forced upwards to squeeze the expansion ring against the top plate, causing the top tube and of the front fork firmly secured to the head tube; when the screw is turned in the reversed direction, the packing block is forced downwards to release the expansion ring, for permitting the top tube of the front fork to be disconnected from the head tube.

2 Claims, 5 Drawing Sheets

BICYCLE HEAD TUBE SEALING STRUCTURE

BACKGROUND AND SUMMARY OF THE INVENTION

The present invention relates to a bicycle head tube sealing structure fastened to the head tube of a bicycle to fix the top tube of the front fork in place by turning a screw to lift a packing block and to expand a split ring.

When the top tube of the front fork of a bicycle is inserted into the head tube, a head tube sealing device must be installed in the top end of the head tube to fix the top tube of the front fork in place. FIG. 1 shows a bicycle head tube sealing structure for this purpose. This bicycle head tube sealing structure comprises a locating plate fixedly fastened to the inside of the top tube of the front fork when the top tube of the front fork is inserted into the head tube, a screw inserted through a cap, which is fastened to the top end of the head tube, and the locating plate, and then threaded into a screw member inside the top tube of the front fork. The locating plate A is fastened to the inside of the top tube of the front fork by a high-pressure mechanism. If the locating plate is not accurately forced into position, it can not work properly and must be removed from the top tube of the front fork. However, removing the tilted locating plate from the top tube of the front fork is not easy, and the front fork may be damage during the dismantling process of the tilted locating plate.

The present invention has been accomplished to provide a bicycle head tube sealing structure which eliminates the aforesaid drawback. According to the preferred embodiment of the present invention, the bicycle head tube sealing structure comprises a plug cap at the top end of the head tube, a packing block disposed inside the top tube of the front fork, a screw inserted through the plug cap and threaded into the packing block, a stop plate mounted inside the top tube of the front fork, a spring mounted around the screw and stopped between the plug cap and the stop plate, and a split ring mounted around the screw between the stop plate and the conical packing block. Therefore, when the screw is turned in one direction, the conical packing block is forced upwards to squeeze the split ring against the stop plate, causing the top tube of the front fork firmly secured to the head tube. However, the top tube of the front fork can be conveniently disconnected from the head tube by turning the screw in the reversed direction to release the packing block from the split ring.

DETAILED DESCRIPTION OF THE PREFERRED EMBODIMENT

Figure 1:
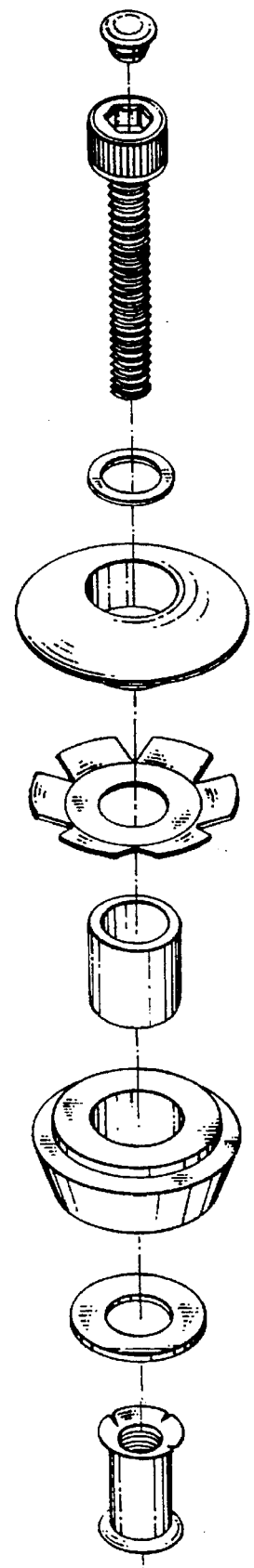
FIG. 1 is an exploded view of a bicycle head tube sealing structure according to the prior art.
Figure 2:
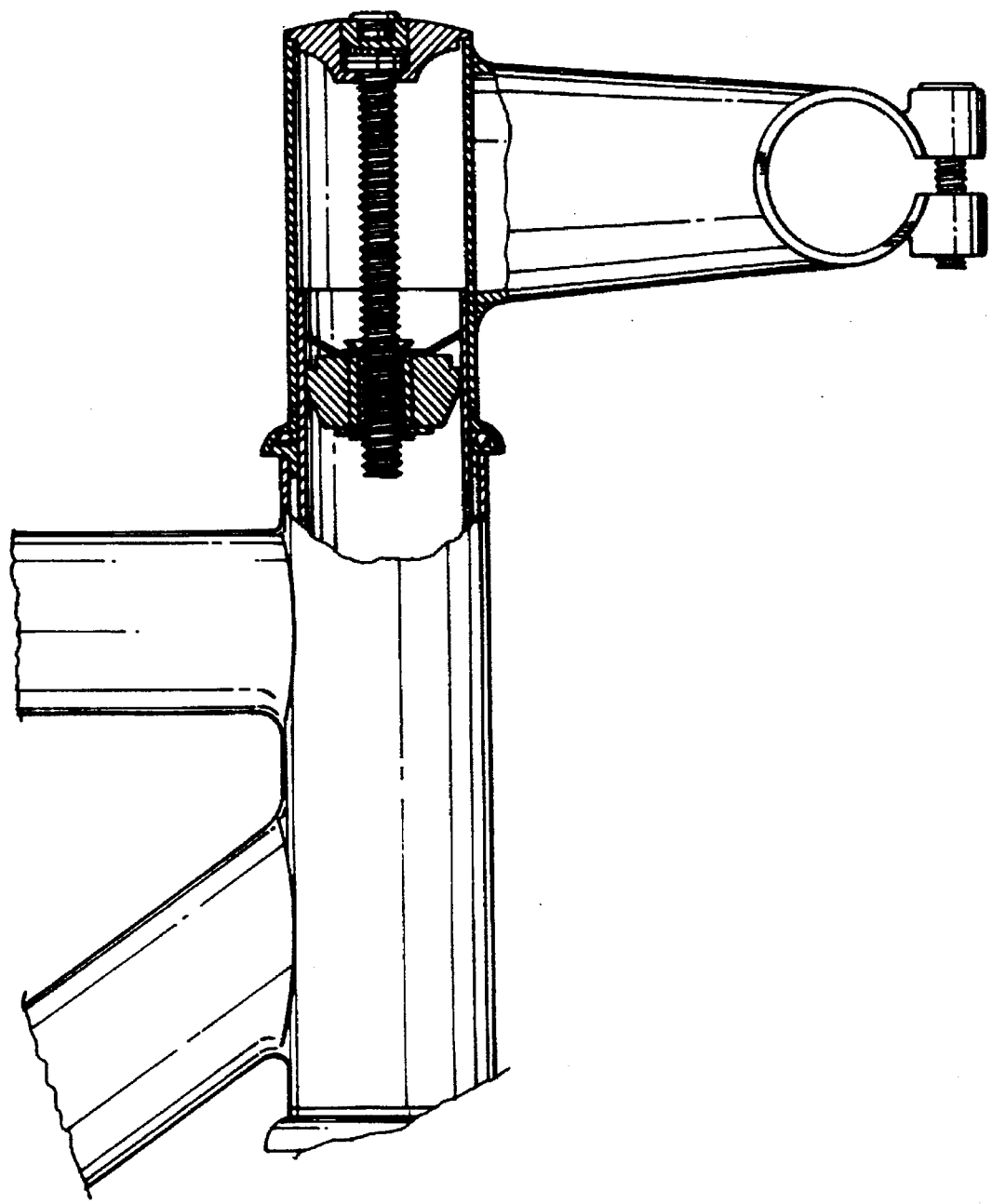
FIG. 2 is a sectional view showing the bicycle head tube sealing structure of FIG. 1 installed.
Figure 3:
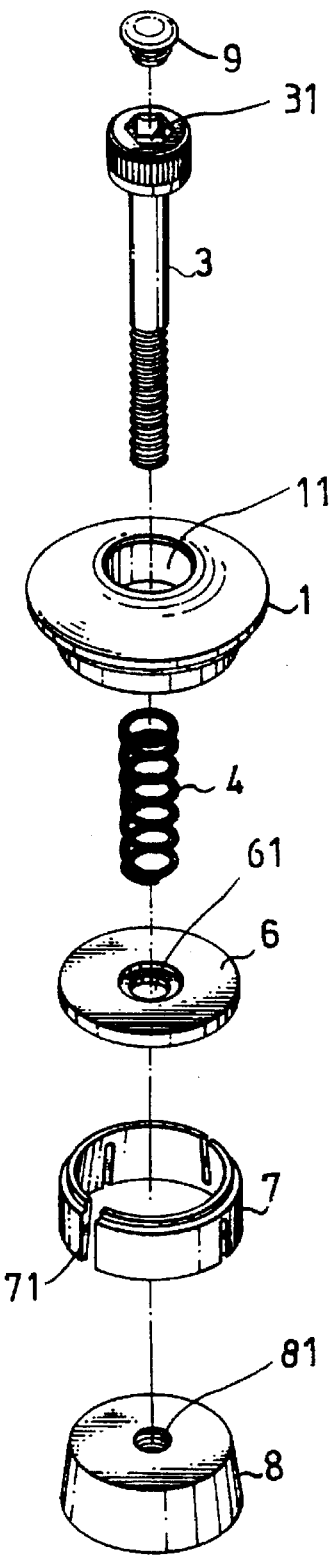
FIG. 3 is an exploded view of a bicycle head tube sealing structure according to the present invention.
Figure 4:
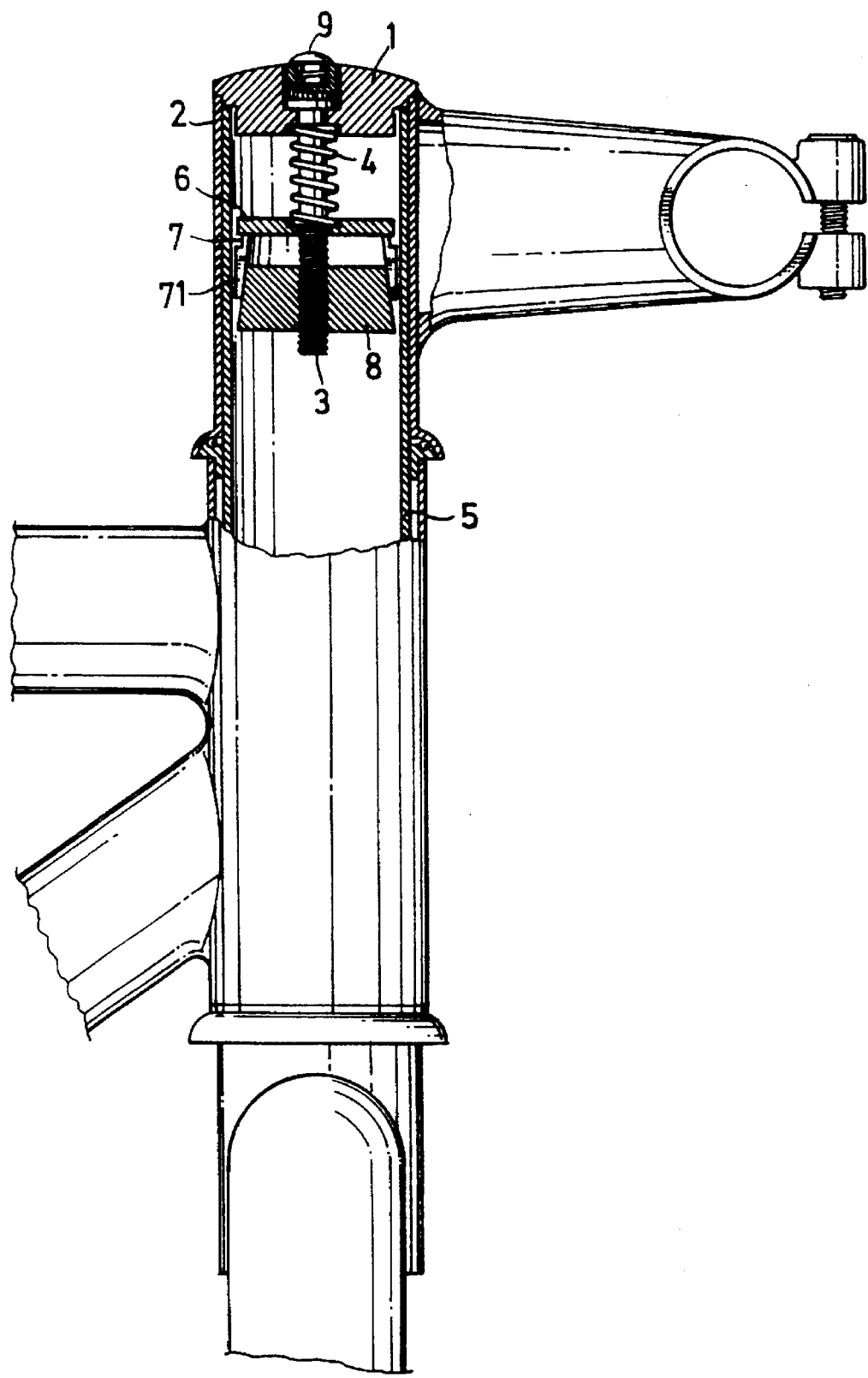
FIG. 4 is a sectional view showing the bicycle head tube sealing structure of FIG. 3 mounted in the head tube of a bicycle.

Referring to FIGS. 3 and 4, a plug cap 1 is fastened to the top end of the head tube 2 and stopped against the top tube of the front fork 5, having a center through hole 11. A screw 3 is inserted through the center through hole 11 of the plug cap 1 and the center through hole 61 of a circular stop plate 6, and then threaded into the center screw hole 81 of a conical packing block 8, which is disposed inside the top tube of the front fork 5. A split ring 7 which has a split 71 is disposed between the stop plate 6 and the conical packing block 8 inside the top tube of the front fork 5. A spring 4 is mounted around the screw 3 inside the top tube of the front fork 5 between the plug cap 1 and the stop plate 6. The outer diameter of the conical packing block 8 gradually reduces toward the top. The inner diameter of the split ring 7 fits the outer diameter of the conical packing block 8. Therefore, when the heat tube sealing structure is installed, the top end of the conical packing block 8 inserts into the bottom end of the split ring 7. Furthermore, the screw 3 has a box head 31 convenient for turning by a socket wrench or spanner, which is covered with a detachable ornamental cap 9.

Figure 5:
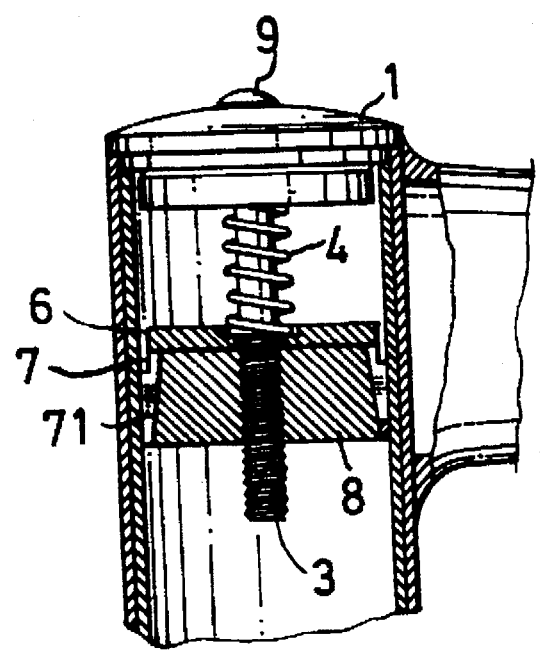
FIG. 5 is similar to FIG. 4 but showing the top tube of the front fork fixed in place.

Referring to FIG. 5, when the screw 3 is turned in one direction, the conical packing block 8 is forced upwards into the split ring 7, causing the split ring 7 expanded and tightly squeezed between the inside wall of the top tube of the front fork 5 and the periphery of the conical packing block 8, therefore the top tube of the front fork 5 is secured inside the head tube 2. On the contrary, when the screw 3 is turned in the reversed direction, the conical packing block 8 is forced downwards from the split ring 7, therefore the split ring 7 is released from engagement with the inside wall of the top tube of the front fork 5, and the front fork 5 can be disconnected from the head tube 2.

I claim:

1. A bicycle head tube sealing structure comprising:

a bicycle front fork with a top tube, said top tube arranged within a bicycle head tube, said top tube having a top and an inside wall, said bicycle head tube having a top end, a plug cap arranged on said top end of said bicycle head tube and abutting said top of said top tube of said bicycle front fork, said plug cap having a center with a stepped hole;

a packing block arranged within said top tube of said front fork, said packing block having a center with screw hole;

a screw inserted through said stepped hole of said plug cap and threaded into said screw hole of said packing block, a head of said screw held by said stepped hole of said plug;

a stop plate arranged within said top tube of said front fork between said plug cap and said packing block, said stop plate having a circular shape with a center hole receiving said screw;

a helical spring mounted around said screw, said spring extending along a length of said screw and abutting said plug cap and said stop plate; and a split ring arranged between said stop plate and said packing block;

said plug cap, said packing block, said screw, said stop plate, said spring and said split ring are arranged so that when said screw is turned in one direction, said packing block is forced upwards squeezing said split ring against said stop plate, and causing said split ring to firmly bind against said inside wall of said top tube of said front fork, thereby firmly securing said top tube of said front fork to said bicycle head tube; and when said screw is turned in an opposite direction, said packing block is forced downwards releasing said split ring, thereby permitting said top tube of said front fork to be disconnected from said bicycle head tube.

2. The bicycle head tube sealing structure of claim 1, wherein said packing block is a conical block having an outer diameter gradually reduced toward said stop plate; and said split ring is a split ring having an inner diameter gradually reducing toward said stop plate and fitting said outer diameter of said packing block.

* * * * *